US009989417B2

(12) United States Patent
Libman et al.

(10) Patent No.: US 9,989,417 B2
(45) Date of Patent: Jun. 5, 2018

(54) TEMPERATURE MEASUREMENT ARRANGEMENT

(71) Applicant: GOJI LIMITED, Hamilton (BM)

(72) Inventors: Avner Libman, Holon (IL); Lior Darshan, Rishon-LeZion (IL)

(73) Assignee: GOJI LIMITED, Hamilton (BM)

( * ) Notice: Subject to any disclaimer, the term of this patent is extended or adjusted under 35 U.S.C. 154(b) by 0 days. days.

(21) Appl. No.: 15/021,454

(22) PCT Filed: Sep. 11, 2014

(86) PCT No.: PCT/IL2014/050813
§ 371 (c)(1),
(2) Date: Mar. 11, 2016

(87) PCT Pub. No.: WO2015/037004
PCT Pub. Date: Mar. 19, 2015

(65) Prior Publication Data
US 2016/0223402 A1    Aug. 4, 2016

Related U.S. Application Data

(60) Provisional application No. 61/876,913, filed on Sep. 12, 2013.

(51) Int. Cl.
*G01J 5/00*    (2006.01)
*G01J 5/08*    (2006.01)
(Continued)

(52) U.S. Cl.
CPC ............... *G01J 5/0862* (2013.01); *G01J 5/06* (2013.01); *H05B 6/705* (2013.01); *G01J 2005/065* (2013.01); *Y02B 40/146* (2013.01)

(58) Field of Classification Search
CPC ...... G01J 3/0291; G01J 5/10; G01J 2005/065; G01J 5/06; G01J 5/0862; Y02B 40/146; Y02B 40/143; Y02B 20/48
(Continued)

(56) References Cited

U.S. PATENT DOCUMENTS 3,536,878 A * 10/1970 Fitzmayer ............. H05B 6/642
                                                    219/746
3,626,135 A * 12/1971 Fitzmayer ............. H01J 23/15
                                                    219/746
(Continued)

FOREIGN PATENT DOCUMENTS

EP    1 329 136 A2    7/2003
EP    1 458 219       9/2004
(Continued)

OTHER PUBLICATIONS

International Search Report in PCT/IL2014/050813, dated Feb. 4, 2015.

*Primary Examiner* — Taeho Jo
(74) *Attorney, Agent, or Firm* — Greenblum & Bernstein, P.L.C.

(57) ABSTRACT

Disclosed is a system for dielectrically processing a product in a radio frequency (RF) cavity. The system may include a cavity; an RF feeding module that includes a plurality of radiating elements configured to feed RF radiation into the cavity, and a plurality of dummy loads for receiving RF energy coupled from the cavity into the radiating elements; and the system includes a processor configured to (a) estimate an effect operating the system at each of a plurality of sets of operating parameters will have on the temperature of each of the dummy loads; (b) choosing among the plurality of sets of operating parameters at least one set based on the estimation; and (c) controlling the system to
(Continued)

operate at the chosen at least one set of operating parameters.

16 Claims, 4 Drawing Sheets

(51) Int. Cl.
  *H05B 6/70* (2006.01)
  *G01J 5/06* (2006.01)
(58) Field of Classification Search
  USPC .................................................. 250/338.1
  See application file for complete search history.

(56) References Cited

U.S. PATENT DOCUMENTS

| | | | | |
|---|---|---|---|---|
| 3,819,900 A * | 6/1974 | Ironfield | ................ | H01P 1/16 219/750 |
| 3,974,696 A * | 8/1976 | Fitzmayer | ............... | A47J 37/00 219/712 |
| 4,489,254 A * | 12/1984 | Koinuma | ................ | H01J 23/05 313/338 |
| 5,693,247 A * | 12/1997 | Bu | ....................... | H05B 6/6455 219/711 |
| 5,982,253 A * | 11/1999 | Perrin | .................... | B60N 2/448 333/182 |
| 6,007,242 A * | 12/1999 | Uehashi | ............... | H05B 6/6447 374/130 |
| 6,063,234 A * | 5/2000 | Chen | ........................ | G01K 7/00 156/345.27 |
| 6,215,112 B1 * | 4/2001 | Kim | ..................... | H05B 6/6447 219/704 |
| 8,360,633 B2 * | 1/2013 | Luckhardt | ............... | F24C 7/087 374/121 |
| 9,351,347 B2 | 5/2016 | Torres et al. | | |
| 9,398,646 B2 * | 7/2016 | Nobue | .................... | H05B 6/686 |
| 9,414,444 B2 * | 8/2016 | Libman | ................ | H05B 6/6435 |
| 2003/0008617 A1 * | 1/2003 | Tamaru | ................ | H04B 1/7136 455/46 |
| 2003/0135971 A1 * | 7/2003 | Liberman | .......... | B01D 67/0041 29/419.1 |
| 2004/0004074 A1 * | 1/2004 | Torngren | ................ | H05B 6/686 219/678 |
| 2001/0188429 | 9/2004 | Carlsson et al. | | |
| 2005/0053118 A1 * | 3/2005 | Stephan | ................ | G01K 11/006 374/122 |
| 2008/0170511 A1 * | 7/2008 | Shorty | .............. | H04L 29/06027 370/254 |
| 2009/0190633 A1 * | 7/2009 | Smith | ..................... | H04B 1/123 375/148 |
| 2010/0187224 A1 * | 7/2010 | Hyde | ..................... | H05B 6/705 219/720 |
| 2010/0308036 A1 * | 12/2010 | Tomita | ................. | H05B 6/6408 219/756 |
| 2012/0067872 A1 * | 3/2012 | Libman | .................. | H05B 6/647 219/702 |
| 2012/0155253 A1 * | 6/2012 | Johansen | ................ | H04L 45/00 370/228 |
| 2012/0164022 A1 * | 6/2012 | Muginstein | ............... | A61L 2/04 422/22 |
| 2012/0302423 A1 * | 11/2012 | Kinoshita | ............... | C03C 3/068 501/37 |
| 2012/0312801 A1 * | 12/2012 | Bilchinsky | ............. | H05B 6/705 219/438 |
| 2013/0010294 A1 * | 1/2013 | Matsuda | ............. | G01N 21/3563 356/326 |
| 2013/0062334 A1 * | 3/2013 | Bilchinsky | ............. | H05B 6/705 219/482 |
| 2013/0087545 A1 * | 4/2013 | Bilchinsky | ............. | H05B 6/705 219/385 |
| 2013/0215930 A1 * | 8/2013 | Kasajima | ............. | G01K 11/32 374/161 |
| 2013/0248521 A1 * | 9/2013 | Torres | ...................... | H05B 6/70 219/728 |
| 2013/0278936 A1 * | 10/2013 | Inoue | ................. | G01B 9/02004 356/479 |
| 2013/0306627 A1 * | 11/2013 | Libman | ................ | H05B 6/6435 219/705 |
| 2014/0220709 A1 * | 8/2014 | Kimura | ............. | H01L 21/67248 438/5 |
| 2014/0287100 A1 * | 9/2014 | Libman | ............. | B65D 81/3446 426/87 |
| 2014/0318489 A1 * | 10/2014 | Ben-Haim | ............ | F23C 99/001 123/143 R |
| 2015/0241363 A1 * | 8/2015 | Tuch | .................... | A61B 5/0077 250/362 |

FOREIGN PATENT DOCUMENTS

| | | | | |
|---|---|---|---|---|
| EP | 1 329 136 B1 | 9/2008 | | |
| WO | 2011/058537 | 5/2011 | | |
| WO | 2012/051198 | 4/2012 | | |
| WO | WO 2012109634 A1 * | 8/2012 | ........... | H05B 6/6435 |

* cited by examiner

TEMPERATURE MEASUREMENT ARRANGEMENT

The present application claims the priority of U.S. Provisional Patent Application No. 61/876,913 filed 12 Sep. 2013, which is incorporated herein by reference.

TECHNICAL FIELD

The disclosed embodiments relate generally to the field of temperature measurement, and more particularly, to the measurement of temperatures of objects under high electromagnetic fields.

BACKGROUND

Temperature measurements are occasionally done inside or in proximity to electronic appliances. A sensor for measuring the physical property is placed inside or in a proximity to the electronic appliance. Many appliances, such as microwave ovens, speakers, televisions or the like may include a plurality of electromagnetic (EM) radiation emitting devices. EM radiation emitting devices such as antennas, waveguides, magnetrons, radiofrequency (RF) energy sources or the like, emit EM energy at a variety of wavelengths and frequencies. The emitted EM energy may cause undesirable electromagnetic interference (EMI) that may damage the sensor or obstruct the sensor's measurements and reduce the sensor's accuracy.

Very often, electromagnetic shielding is employed to the sensor, to confine or sufficiently attenuate the radiation emitted from the appliance so that EMI is effectively prevented.

The description above is presented as a general overview of art in this field and should not be construed as an admission that any of the information it contains constitutes prior art against the present patent application.

SUMMARY

An aspect of some embodiments of the disclosed technology may include a system for dielectrically processing a product in a radio frequency (RF) cavity. The system may include an RF feeding module operative to feed RF energy into the cavity at various frequencies for processing the product. The system may further include a dummy load, configured to receive RF energy returning from the cavity. The dummy load may be located in an electromagnetically noisy space. The system may also include a temperature sensing arrangement configured to measure the temperature of the dummy load. The temperature sensing arrangement may include:

an RF filter configured to allow propagation of IR radiation through the filter and configured so that propagation of the various frequencies through the filter is substantially unsupported; and a temperature sensor operative to measure the temperature of an object based on the amount of infrared (IR) radiation that propagates through the filter and arranged with respect to the RF filter to be substantially unaffected by the electromagnetic noise in the electromagnetically noisy space.

In some embodiments, the system comprises a processor operatively coupled with the RF feeding module and the temperature sensing arrangement to enable operating the RF feeding module based on the measured temperature of the dummy load.

In some embodiments, the processor is programmed to operate the RF feeding module based on the temperature of the dummy load as measured by the temperature sensing arrangement.

In some embodiments, the RF filter comprises electrically conductive walls defining an electrically non-conductive core. The dimensions of the non-conductive core may be such that propagation of frequencies of electromagnetic noise through the core is not supported while the propagation of IR radiation through the core is allowed. In some embodiments, the temperature sensor is arranged in an EMI-free space created by an electromagnetic shielding. The EMI-free space and the electromagnetically noisy space may be in IR radiation communication with each other via the RF filter. In some embodiments, the system comprises the electromagnetic shielding. The electromagnetic shielding may create the EMI-free space.

In some embodiments, the RF filter is in communication with the electromagnetically noisy space via an opening in the electromagnetic shielding. In some embodiments, the RF filter and the electromagnetic shielding are integrally formed.

In some embodiments, the RF filter comprises an RF waveguide having a cutoff frequency above any one of the various frequencies, and length sufficient to attenuate any one of the various frequencies by at least 10 dB.

An aspect of some embodiments of the disclosed technology may include a method of controlling a system for processing objects by RF energy in a cavity. The system may be as described above. The method may include: measuring the temperature of the dummy load using a temperature sensing arrangement; and controlling the RF feeding module based on the measured temperature. The temperature sensing arrangement may include a radiofrequency (RF) filter configured to allow propagation of IR radiation through the filter and configured so that propagation of RF frequencies through the filter is substantially unsupported; and a temperature sensor operative to measure the temperature of an object based on the amount of the infrared (IR) radiation that propagates through the filter and arranged with respect to the RF filter such to be substantially unaffected by the RF frequencies.

In some embodiments, controlling the RF feeding module may include controlling for at least one of the following operating parameters: amplitude difference or ratio between at least two feeds, phase difference between at least two feeds, and frequency of the RF radiation. Additionally or alternatively, controlling the RF feeding module may include controlling the power, e.g., the power level at which RF energy is input into the cavity.

In some embodiments, controlling the RF feeding module may be performed in such a manner, that overheating of the dummy load is avoided.

In some embodiments, the operating parameters may be controlled in such a manner that the temperature of the dummy load is reduced if an overheating criterion is met. In some embodiments, the overheating criterion includes at least one of the following: a maximal measured temperature threshold that is not to be exceeded; and a rate in measured temperature increase that is not to be exceeded.

An aspect of some embodiments of the disclosed technology may include a temperature sensing arrangement for measuring the temperature of an object positioned in an electromagnetically noisy space with respect to RF frequencies. The arrangement may include: a radiofrequency (RF) filter, wherein the RF filter is configured to allow propagation of IR radiation through the filter and configured so that propagation of RF frequencies through the filter is substantially unsupported; and a temperature sensor operative to measure the temperature of an object based on the amount of the infrared (IR) radiation that propagates through the filter and arranged with respect to the RF filter such to be substantially unaffected by the RF frequencies.

In some embodiments, the RF filter may comprise electrically conductive walls defining an electrically non-conductive core. The dimensions of the non-conductive core may be such that propagation of frequencies of electromagnetic noise through the core is not supported while the propagation of IR radiation through the core is allowed. In some embodiments, the temperature sensor is arranged in an EMI-free space that is created by an electromagnetic shielding. The EMI-free space and the EM noisy space may be in IR radiation communication with each other via the RF filter.

In some embodiments, the electromagnetic shielding makes part of the temperature sensing arrangement. In some embodiments, the RF filter and the electromagnetic shielding are integrally formed.

In some embodiments, the RF filter is in communication with the electromagnetically noisy space via an opening in the electromagnetic shielding.

In some embodiments, the RF filter comprises an RF waveguide having a cutoff frequency above any one of the various frequencies, and length sufficient to attenuate any one of the various frequencies by at least 10 dB.

A temperature sensing arrangement as described above may be used in any one of the methods described above. Similarly, a temperature sensing arrangement as described above may be used in any one of the systems described above.

This summary is provided to introduce a selection of concepts in a simplified form that are further described below in the Detailed Description. This Summary is not intended to identify key features or essential features of the claimed subject-matter, nor is it intended to be used to limit the scope of the claimed subject-matter.

BRIEF DESCRIPTION OF THE DRAWINGS

Features of the invention will become more clearly understood in the light of the ensuing description of a some embodiments thereof, given by way of example only, with reference to the accompanying figures, wherein.

The drawings taken with description make apparent to those skilled in the art how the invention may be embodied in practice.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical but may not be referenced in the description of all figures.

DESCRIPTION OF EMBODIMENTS

Aspects of embodiments relate to an arrangement for sensing, in a contactless manner, temperature of an object placed in an electromagnetically noisy space. In embodiments, aspects also relate to providing information relating to the sensed physical quantity outside the electromagnetically noisy space for further processing. Aspects of embodiments may also relate to a method of operating an RF feeding module, based on the temperature of a dummy load sensed by a temperature sensing arrangement operating in a contactless manner, wherein the RF feeding module is operative to radiate RF energy into a cavity for dielectrically processing a product positioned in the cavity. The cavity may be a resonant cavity, resonating at frequencies fed for processing the object. The processing may include drying, thawing, and/or heating. The product may be dielectrically processed by application of RF energy to the cavity, e.g., via one or more radiating elements of a feeding module.

The term "RF radiation" or "RF energy" as used herein may refer to electromagnetic (EM) radiation having a spectrum that may, for example, range from about 3 kHz to about 300 GHz. In some other examples, the applied RF energy may fall within frequency bands between about 500 MHz to about 1500 MHz or between about 700 MHz to about 1200 MHz or between about 800 MHz to about 1 GHz. Microwave energy and ultra-high frequency (UHF) energy, for example, are both within the RF energy range. In some embodiments, the applied electromagnetic energy may fall within one or more Industrial, Scientific and Medical (ISM) frequency bands like, for example, between 433.05 MHz and 434.79 MHz and/or between 902 MHz and 928 MHz and/or between 2400 MHz and 2500 MHz, and/or between 5725 MHz and 5875 MHz.

The term "cavity" as used herein may refer to any void comprising at least one wall made from a material substantially opaque to RF energy. More than one wall or all the walls of a cavity may be made from materials opaque to RF energy. For example, an oven constructed from cast iron, stainless steel, or Al(Si) alloys or other metals and alloys suitable for constructing a cavity. Alternatively, the at least one wall may comprise a dielectric material at least partially transparent to RF energy and coated by a coating made from material substantially opaque to RF energy. A material substantially opaque to RF energy may be any material capable of blocking or reflecting RF energy above a predetermined threshold (e.g., above 90%).

In the discussion, the term "sensed temperature" and "measured temperature" and grammatically variations thereof may be used interchangeably. Further, a measured temperature or sensed temperature may correspond to an average or median temperature of one or more objects measured or sensed over a time period by the temperature sensor. In some embodiments, the measured temperature may relate to measurements performed by plurality of temperature sensors. For example, the "measured temperature" of an object may relate to the average or median temperature measurements performed by a plurality of temperature sensors. In some embodiments, the temperature measurements may be performed sequentially or about simultaneously by the plurality of temperature sensors.

As discussed herein, the wording "the measured temperature of an object or dummy load" as well as grammatical variations thereof may correspond to "a temperature that is read and/or measured and/or sensed and which is indicative of the temperature of the object or dummy load".

It should be noted that the arrangement and configuration of components described herein and in the Figures are provided for exemplary purposes only and should by no means be construed as limiting beyond the limitations provided in the appended claims.

Figure 1:
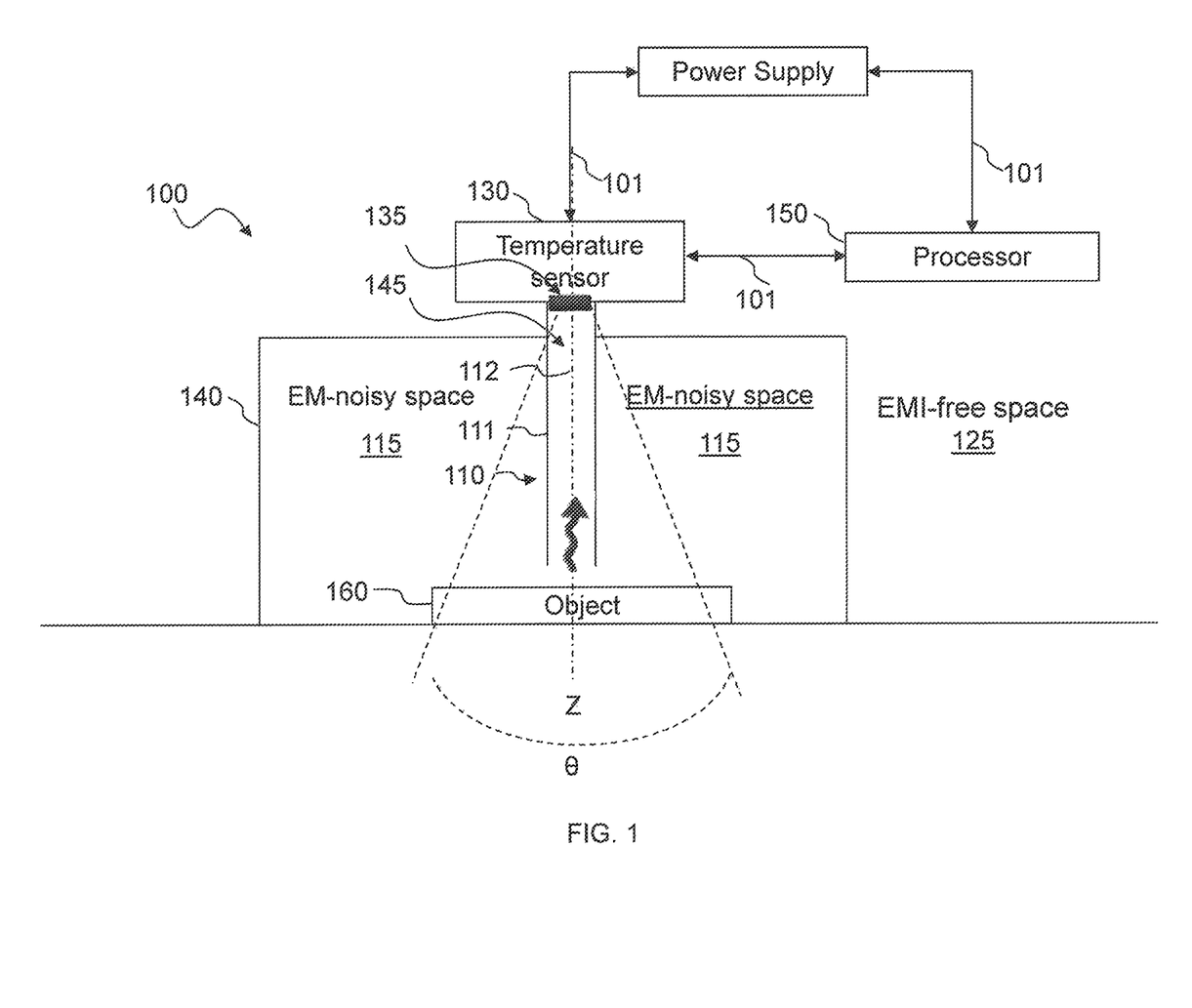
FIG. 1 is a schematic illustration of a contactless temperature sensing arrangement, according to some embodiments.

Reference is made to FIG. 1, which is a schematic illustration of a temperature sensing arrangement 100, according to some embodiments.

According to some embodiments, temperature sensing arrangement 100 is operative to measure the temperature of an object 160 or a portion thereof in an electromagnetically (EM) noisy space 115. The wording "operative to measure the temperature of an object" as used herein may also encompass the meaning of the wording of "operative to measure the temperature of a part of an object".

Temperature sensing arrangement 100 may comprise a temperature sensor 130 that is operative to measure, in a contactless manner, the temperature of object 160, e.g., by sensing the amount of infrared (IR) radiation emitted therefrom. Temperature sensing arrangement 100 may further comprise a radiofrequency (RF) filter 110. RF filter 110 may have electrically conductive walls 111 defining an electrically non-conductive core 112. The non-conductive core may be filled with air or may be filled with dielectric material, wholly or partially. The dimensions of the non-conductive core 112 are such that propagation of frequencies of electromagnetic noise through the core is not supported or substantially not supported, allowing, for example, maximal 0.01%, maximal 0.05%, maximal 1%, maximal 5% or maximal 10% of the electromagnetic noise to emanate from RF filter 110. On the other hand, the propagation of IR radiation through electrically non-conductive core 112 is enabled. In other words, RF filter 110 may be configured to have IR waveguiding properties. The dielectric material filling the non-conductive core 112 may have a dielectric constant that may support the propagation of the IR radiation in the RF filter 110. RF filter 110 may be arranged relative to temperature sensor 130 so that temperature sensor 130 can be responsive to IR radiation that emanates from EM noisy space 115 and propagates through non-conductive core 112 while, on the other hand, temperature sensor 130 is substantially unaffected by the electromagnetic noise. Considering for example temperature sensor 130 comprising an active sensing area 135 having a field of view (FOV) θ, may be arranged so that the FOV's optical axis Z may be about in alignment with the lengthwise, rotational symmetry axis of non-conductive core 112. Temperature sensor 130 may be considered substantially unaffected by the electromagnetic noise, if the electromagnetic noise at least does not damage the sensor. In some embodiments, temperature sensor 130 may be considered substantially unaffected by the electromagnetic noise, if the electromagnetic noise does not affect the readings of sensor by more than a predetermined degree. The predetermined degree may be set in accordance with the required accuracy, and the temperature sensing arrangement may be designed and/or manufactured accordingly.

In some embodiments, RF filter 110 may form a waveguide for radio frequencies, with a cutoff above the highest frequency generating the noise in EM-noisy space 115. For example, the EM noisy-space may be a microwave cavity, fed with microwaves, for processing objects in the cavity. The microwaves fed into the cavity may be of various frequencies, and in some embodiments may be arranged in one or more frequency bands, for example, from 2.4 GHz to 2.5 GHz, from 902 MHz to 928 MHz, or any other frequency band, either allowed for industrial, scientific and medical use, or not. The processing may include, for example, drying, thawing, and/or heating. In some embodiments, the EM noisy-space may be a cavity of a microwave oven for cooking food. Filter 110 may form a waveguide with a cutoff frequency above the highest frequency used for the processing. For example, if processing is by microwaves at frequencies between 2.4 GHz and 2.5 GHz, the filter may comprise a waveguide having a cutoff frequency of 3 GHz, 4 GHz, 4.8 GHz, or any intermediate or higher cutoff frequency. In another example, the processing may be by frequencies in the range of 902 MHz to 928 MHz, and the filter may be in the form of a waveguide having a cutoff frequency of 1200 MHz, 1500 MHz, 2000 MHz, or any intermediate of higher cutoff frequency.

In some embodiments, the EM-noisy space may be outside a microwave cavity, but still receives from the cavity radiation at intensities that might affect the sensor. For example, the sensor may be an IR sensor configured to measure temperature of a dummy load (e.g., dummy load 165A or 165B shown in FIG. 2). In this example also, filter 110 may form a waveguide having a cutoff frequency higher than the highest frequency used for processing objects in cavity 210. As used herein, if a machine is described as "configured to" perform a task (e.g, IR sensor configured to measure temperature of a dummy load), then, at least in some embodiments, the machine may include components, parts, or aspects (e.g., software) that enable the machine to perform the task. In some embodiments, the machine may perform the task during operation.

In some embodiments, filter 110 may be cylindrical, having an inner diameter smaller than half a free space wavelength of the lowest frequency used for processing objects in the cavity. The attenuation provided by the waveguide, in dB, may be roughly approximated by the expression $$32\frac{d}{a}\sqrt{1 - (f/f_{cutoff})^2}$$

where d is the length of the filter (i.e., height of the cylinder in the above example), a is the diameter of the filter, f is the frequency to be attenuated and $f_{cutoff}$ is the cutoff frequency. Thus, for frequencies much higher than the cutoff frequency, the attenuation may be linear with the length of the waveguide, and be roughly approximated as 32 d/αdB.

In some embodiments, the attenuation provided by the waveguide, for each of the various frequencies used for processing the object is at least 5 dB, at least 10 dB, at least 20 dB, at least 30 dB, or any intermediate attenuation. In some embodiments, the waveguide is designed with such cutoff frequency, length, and diameter, that the attenuation calculated by the above expression is at least 5 dB, 10 dB, 20 dB, 30 dB, or any intermediate calculated attenuation.

According to some embodiments, temperature sensor 130 may be arranged in an EMI-free space 125 that is created by an electromagnetic (EM) shielding 140. A space may be considered EMI free if EM noise therein does not damage the temperature sensor. In some embodiments, a space may be considered EMI free if EM noise therein does not affect the readings of the temperature sensor by more than a predetermined degree (e.g., by more than 20° C., 10° C., 5° C., or any intermediate degree.) EM shielding 140 may be configured to sufficiently attenuate or prevent RF radiation present in EM noisy space 115 from being irradiated outside EM noisy space 115. EMI-free space 125 and EM noisy space 115 may be in IR radiation communication through RF filter 110, e.g., by extending through an opening 145 of EM shielding 140. In other words, IR energy emanating from EM-noisy space 115 may propagate through EM shielding 140 into EMI-free space 125, while preventing radiation of frequencies of RF radiation out of EM-noisy space 115 into EMI-free space 125. Opening 145 may have dimensions configured to attenuate or block the propagation of the RF radiation through the opening while allowing the IR radiation to exit into EMI-free space 125. Alternatively, or additionally, Opening 145 may include an RF attenuator or an RF choke configured to attenuate or block the propagation of the RF radiation through the opening while allowing the IR radiation of exit into EMI-free space 125.

Accordingly, temperature sensing arrangement 100 may be operative, from EMI-free space 125, of direct wireless or direct contactless sensing of a physical quantity indicative of the temperature within EM noisy space 115, which may herein also be referred to as "temperature measurement" or "temperature sensing". Thus, while a stimulus relating to temperature may originate from within EM noisy space 115, the actual sensing of the stimulus may occur within EMI-free space 125. In some embodiments, temperature sensor 130 may be arranged at some distance away (e.g., about 1.5 mm) from the output of RF filter 110.

According to some embodiments, RF filter 110 may be configured so that, on the one hand, the intensity of RF radiation that may present within EM noisy space 115 is attenuated so that substantially no RF radiation is guided by RF filter 110 from within EM noisy space 115 to the exterior EMI-free space 125 while, on the other hand, allowing IR radiation emanating from EM noisy space 115 to propagate substantially unobstructed to an EMI-free space 125 via opening 145 of EM shielding 140 to temperature sensor 130 for sensing. For instance, the intensity of RF radiation at a frequency ranging between about 800-1000 MHz, 902-928 MHz or 2400-2500 MHz may be attenuated, for example, by about 50-120 dB, or 60-160 dB by an RF filter 110 having for example a core diameter of about 1.5 mm to about 5 mm; or about 2 mm to about 5 mm, and a length of for example at least 4 mm or at least 5 mm up to, for example, about 7 mm, 10 mm or 12 mm. RF filter 110 may thus function as a low-pass filter attenuating and/or reflecting frequencies of RF radiation that may be present in EM noisy space 115. Therefore, the sensing of IR radiation by temperature sensing arrangement 100 may be implemented in a manner that obviates the need of employing an active RF filter.

According to some embodiments, RF filter 110 may include an optical fiber (not shown) for guiding IR radiation out of EM noisy space 115 while attenuating and/or reflecting frequencies of RF radiation in EM noisy space 115.

According to some embodiments, temperature sensing arrangement 100 may comprise EM shielding 140. EM shielding 140 may include an RF opaque material that is configured to block, absorb or reflect RF radiation. Shielding 140 may hinder or prevent RF radiation present in EM noisy space 115 from being irradiated outside EM noisy space 115 to EMI-free space 115. According to some embodiments, RF filter 110 and EM shielding 140 may be integrally formed. For example, filter 110 and shielding 140 may be welded or soldered together. RF filter 110 and EM shielding 140 may be assembled such that little or no RF radiation may escape via opening 145 or via the contact area between filter 110 and shielding 140. In some embodiments, an RF choke or any other RF attenuator may be assembled to reduce or block the RF radiation from escaping via opening 145. Filter 110 and shielding 140 may be joined together to ensure good mechanical and electrical contact such that no RF radiation can escape the contact area between filter 110 and shielding 140.

According to some embodiments, temperature sensor 130 may be located in EMI-free space 125 and operatively coupled via a signal line 101 to a power supply 151. Temperature sensor 130 may be operative to sense IR radiation in a spectrum ranging, for example, from about 0.7 micron to about 1000 micron and may, for example, employ a thermopile sensor. The amount of IR radiation sensed thereby may be indicative of the temperature of object 160, which may for example be embodied by one or more dummy loads, as outlined herein below in greater detail. According to some embodiments, temperature sensor 130 may comprise a secondary heating sensor (not shown) operative to measure a temperature of EMI-free space 125 to enable neutralizing, offset or correcting for influences a temperature in EM-free space 125 might have on the accuracy of temperature measurement from EM noisy space 115. Additional reference is made to FIG. 2. A heating system 200 may include a cavity 210 and one or more RF feeding modules, hereinafter referenced as RF feeding modules 190A and 190B, operative to feed RF energy into cavity 210 for dielectrically heating one or more products 230 located therein, and an embodiment of temperature sensing arrangement 100 as outlined herein.

Figure 2:
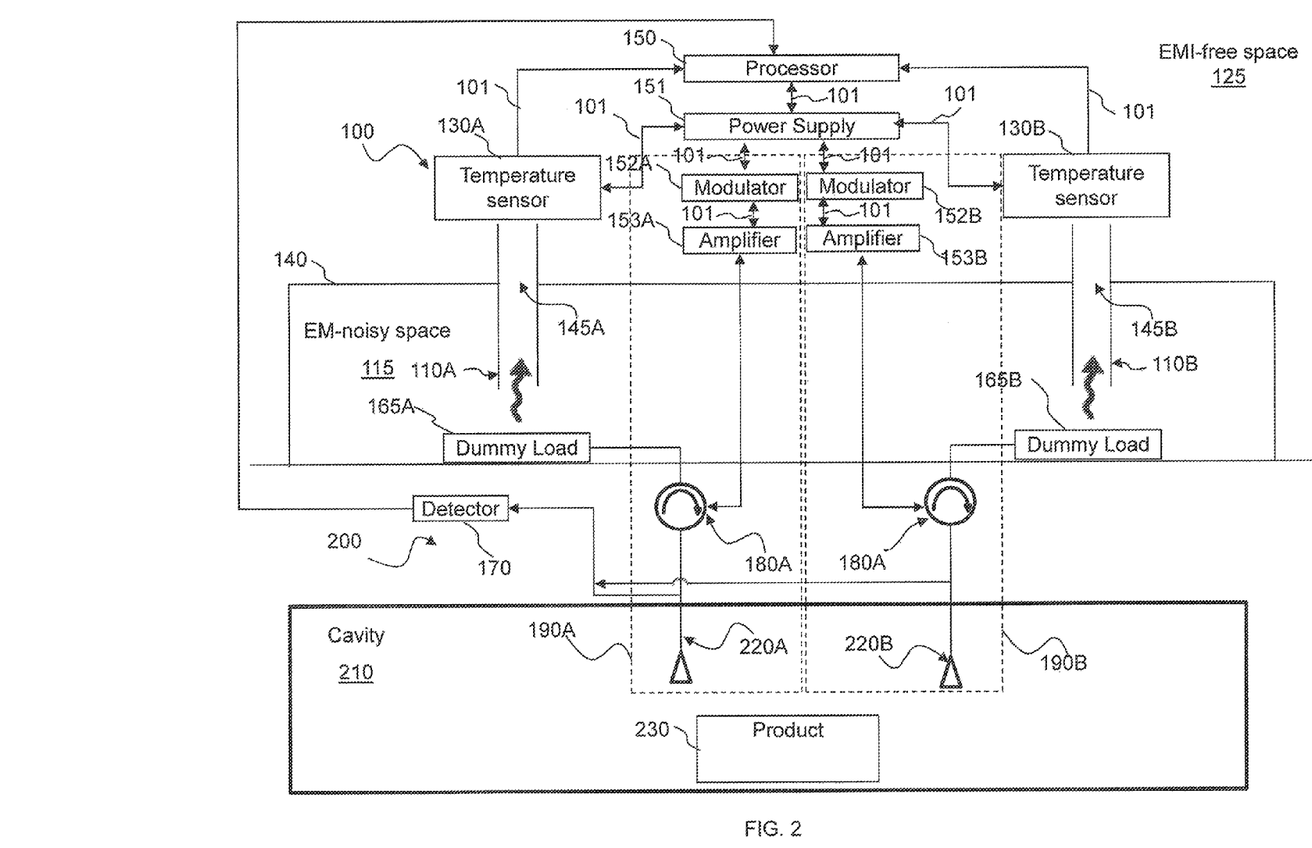
FIG. 2 is a schematic illustration of a heating system comprising a contactless temperature sensing arrangement, according to some embodiments.

Temperature sensing arrangement 100 of heating system 200 may for example include one or more dummy loads (e.g., dummy loads 165A and 165B) as object 160. To simplify the discussion only, the one or more dummy loads may hereinafter be referenced with the two reference numerals "165A" and "165B". However, this should be no means to be construed as limiting. Accordingly, heating system 200 may for example comprise only one dummy load or more than two dummy loads. Temperature sensing arrangement 100 of heating system 200 may further include one more temperature sensors, which may hereinafter be referred to as temperature sensors 130A and 130B. Dummy loads 165A and 165B may be operatively coupled with cavity 210 so that RF energy that is not absorbed in cavity 210 may be reflected back from and/or coupled to any one of radiating elements 220A and 220B and guided back to dummy loads 165A and 165B, respectively, where the RF energy may be absorbed and converted into heat. The temperature of dummy loads 165A and 165B measured by temperature sensors 130A and 130B may thus be indicative of the amount of RF energy that is absorbed in cavity 210 and, therefore, may provide an indication of the amount of RF energy absorbed by product 230. For example, the higher the temperature and/or the higher the rates in temperature increase of dummy loads 165A and 165B, the less efficient may be the absorption of RF energy by cavity 210, which may be indicative to less efficient absorption of RF energy by product 230.

According to some embodiments, the RF energy that may be reflected and/or coupled to radiating elements 220A and 220B may be diverted to dummy loads 165A and 165B by circulators 180A and 180B, respectively. Such RF energy may include a plurality of RF frequencies. In some embodiments each of RF filters 110A and 110B may be designed to filter out or block the RF energy at the plurality of frequencies. For example, if the RF energy reflected and/or coupled to radiating elements 220A and 220B is applied using a frequency band of 800-1000 MHz, the dimensions of RF filters 110A and 110B and/or a dielectric material included in RF filters 100A and 110B are such that frequencies at 800-1000 MHz may be blocked from progressing via RF filters 110A and 110B towards temperature sensor 130. RF filters 110A and 110B may be designed to filter out the various frequencies which are used to process or heat object 160. Therefore, in case that the frequency band selected has changed significantly, for example, when the frequency band used includes frequencies below a cutoff frequency of filter 110, the RF filters may have to be replaced.

According to some embodiments, processor 150 may be operative to process the IR radiation sensed by temperature sensor 130 so that heating system 200 may be operated based on the sensed IR radiation. Otherwise stated, processor 150 may be operative to adjust, based on IR sensing by temperature sensor 130, one or more operating parameters of heating system 200. An operating parameter may for example relate to amplitude and/or frequency and/or a phase of RF radiation between radiating elements and/or a phase and/or power and/or heating duration and/or a radiating element within cavity and/or a product position within cavity.

The operating parameter may include any controllable parameter that is related to the application the RF energy into cavity 210 from radiating elements 220A and 220B. The parameter may be controllable, for example by processor 150, and/or by any other controller (not shown) configured to control the radiation into cavity 210. The operating parameter may include the frequency or frequencies in which the RF energy is being emitted, for example, the operating parameter may include a frequency band, e.g., 500 MHz to about 1500 MHz or between about 700 MHz to about 1200 MHz or between about 800 MHz to about 1 GHz. Alternatively or additionally, the operating parameter may be frequencies at which energy is applied and frequencies at which energy is not emitted, for example: emit at 910 MHz, don't emit at 912 MHz. The operating parameter may include the power (e.g., the intensity) in which the RF energy is being applied. The power may be controlled by an RF source (not illustrated) supplying the RF energy to the radiating elements, for example, the RF energy may be applied at 50 watts, 100 watts, 250 watts, 500 watts, 1000 watts, 2000 watts, or intermediate power levels. In some embodiments, the RF energy may be applied using different power levels at different frequencies, for example, energy may be applied at 800 MHz at 250 W and at 1 GHz at 200 W. Furthermore, two radiating elements may emit at the same time and at the same frequency electromagnetic waves of different amplitudes. Thus, the amplitude emitted by each of the radiating elements may constitute an operating parameter, as well as amplitude differences (or ratios) between emissions emitted by two radiating elements. Furthermore, two radiating elements may emit at the same time and at the same frequency electromagnetic waves at different phases. Thus, phase differences (or ratios) between emissions emitted by two radiating elements may constitute operating parameters.

Controlling frequency, phase, and/or amplitude as described above may control the shape of a field pattern excited in the cavity. In addition, controlling the voltage at which each field pattern is excited may control the amount of energy reaching different locations in the cavity over time.

In some embodiments, operating parameters controlled in response to measured dummy load temperature may include a phase difference in which the RF waves are radiated from radiating elements 220A and 220B. The RF energy may be radiated from both radiating elements at the same frequency, at the same time, but at a predetermined phase difference. If more than two radiating elements are placed in cavity 210, the radiating elements may emit RF energy at a plurality of phase differences at the same time, so that, each pair of radiating element may emit RF energy at the same frequency (simultaneously) but with a different phase in relation, for example, to radiation emitted from a reference radiating element, which may be one of the more than two radiating elements. In some embodiments, each pair of radiating elements may emit RF energy at a plurality of frequencies and, at each frequency, at a plurality of phase differences. In some embodiments, when more than one radiating element is located in cavity 210, a processor, for example, processor 150, may be configured to select which radiating element(s) is (are) to apply the RF energy. The number and identity of radiating elements applying RF energy to the cavity may also be included in the operating parameters. Radiating elements of different identity may be, for example, at different locations, shapes, kinds, etc. Furthermore, the duration of the application of the RF energy from each of the radiating elements may also be included in the operating parameters. For example, the processor may be configured to select to apply RF energy from radiating element 220A for 300 seconds and to apply RF energy from radiating element 220B for 200 seconds, 0 seconds, or any other duration.

An operating parameter may for example be adjusted if processor 150 determines, based on the measured temperature, that an overheating criterion relating to a dummy load is met. An overheating criterion may for example comprise a measured temperature threshold of the dummy load(s) not to be exceeded during a predetermined time period and/or a rate of temperature increase of the dummy load(s) not to be exceeded. According to some embodiments, the adjustment of operating parameters for reducing the temperature of the dummy load(s) may be performed until a "safe-operating criterion" is met. For example, adjusting the operating parameter(s) for reducing the temperature (or the temperature increase, or the temperature increase rate) of the dummy load(s) may include reducing the duration of the application of the RF energy and/or reducing the number of radiating elements applying the RF energy and/or reducing the power at which the RF energy is applied. In some embodiments, reducing the temperature may include stopping RF energy intermitting to allow the dummy load to cool to be within a safe temperature range. The intermission may be for a predetermined time period, or until the temperature of the dummy load is measured to be safe. The safe-operating criterion may for example comprise a safe temperature threshold measured during a predetermined time period, below which temperature the operating parameter may no longer be adjusted for reducing the temperature of the dummy load(s). Additionally or alternatively, the safe-operating criterion may for example comprise a rate of temperature decrease to be met.

For example, when the temperature measured by temperature sensor 130 exceeds a predetermined non-safe temperature threshold, operating parameters may be adjusted by processor 150 in a manner to decrease the measured temperature of the dummy load(s) to fall below a predetermined safe temperature threshold during a predetermined time period. In some embodiments, the temperature may be reduced by additional cooling devices (not illustrated), for example, heat sink or any other heat exchanger, cooling tubes with coolant, or the like. In some embodiments, processor 150 may be configured to operate the cooling device (e.g., introducing the coolant into the cooling tubes) when the temperature of the dummy load(s) exceed the temperature threshold.

According to some embodiments, adjusting an operating parameter or parameters by processor 150 may correspond to changing the system's operating mode from a "default heating mode" to an "overheat protection" heating mode. In some embodiments, in overheat protection mode, heating is ceased at all frequencies until the measured temperature falls below the predetermined safe temperature threshold.

In some embodiments, the operating parameters may include parameters that do not affect the total power reflected back to the dummy loads, but does affect the distribution of the reflected power between the dummy loads. For example, at one set of operating parameters, 20 W out of input power of 100 W may be absorbed in the cavity, 75 W may be absorbed by a first dummy load (say 165A), and 5 W may be absorbed by a second dummy load (say 165B). At another set of operating parameters, 20 W may be absorbed in the cavity out of input power of 100 W, 5 W may be absorbed by the first dummy load, and 75 W may be absorbed by the second dummy load. By switching from the first set of operating parameters to the second, the temperature of the first dummy load may be allowed to cool. In some embodiments, switching between sets of operating parameters that differ in the distribution of returning power among the dummy loads may allow preventing overheating of any one of the dummy loads without slowing down the heating process. In some embodiments, some slowing down may take place, but small in comparison to the slowing down that may have been required if the distribution of the returning power among the different dummy loads was not considered. Thus, according to some embodiments, there may be provided a method of operating a dielectric heating system that includes estimating how much power returns to each dummy load at each set of operating parameters, and choosing sets of operating parameters that maintain the temperature of each of the dummy loads within a safe temperature range. For example, sets of operating parameters may be chosen so that the amount of power absorbed by each of the dummy loads individually may be within some predetermined limit. The limit may depend on the temperature of the dummy load. For example, a warmer dummy load may have a lower allowable limit of power to be absorbed.

In some embodiments, estimating the amount of power that will be absorbed by a dummy load if the system is operated at a certain set of operating parameters may include operating the system in the said set of operating parameters by at low power, that does not cause significant temperature change to any of the dummy loads, measuring the reflections to each of the dummy loads, and estimating, based on the measured reflections, how much power is expected to be reflected when the system is operated at high power, useful for processing the object. In some embodiments, the percentage of input power that is reflected to each dummy load does not depend on the input power, so the power returned out of 500 W input power, for example, might be 10 times larger than the power returned out of 50 W input power.

Figure 4:
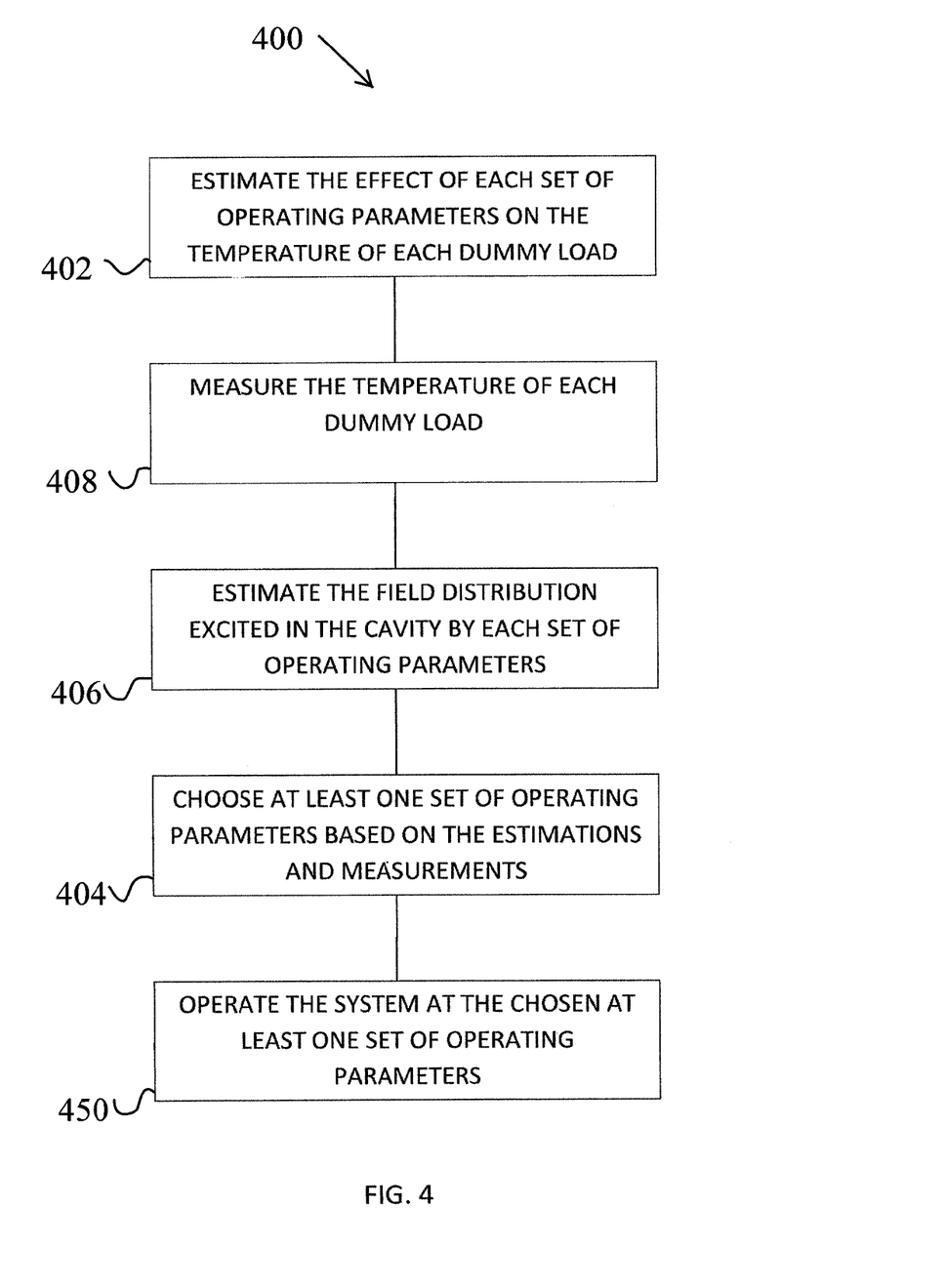
FIG. 4 is a flowchart of actions taken in a method according to some embodiments.

FIG. 4 is a flowchart of actions taken in a method 400 according to some embodiments. Method 400 may be a method of controlling a system for processing objects by RF energy in a cavity. The system may include an RF feeding module that comprises a plurality of radiating elements for feeding RF radiation into the cavity, and a plurality of dummy loads for receiving RF energy coupled from the cavity into the radiating elements. In some embodiments, each radiating element is connected to a dummy load, so that each dummy load receives energy from a single radiating element. The system may be operated at a plurality of sets of operating parameters. Each set may include, for example, one, two, three, or larger number of operating parameters. For example a set may include frequency alone. In another example, the set may include both frequency and phase difference. In some embodiments, a set of operating parameters may include at least two of frequency, phase difference, and amplitude ratio. Method 400 may include a step 402 of estimating the effect that operating the system at each of a plurality of sets of operating parameters will have on the temperature of each of the dummy loads. For example, it may be estimated that operating the system at power of 250 W at a set of operating parameters that cause 20% of the input power to arrive at one of the dummy loads, the dummy load will absorb 50 J in one second of operation. This number may be used to estimate the temperature, for example, using known heat capacity of the dummy load. In some embodiments, however, the estimation of the effect on the temperature does not include estimation of a specific temperature change, but rather an estimation if the temperature will be increased more or less than by another set of operating parameters. This may be done, for example, by direct usage (e.g., by the processor) of the power levels reflected from the cavity to the dummy load. Thus, in some embodiments, estimating the effect of the operation of the system at a particular set of operating parameters on the temperature of the dummy load is by estimating the amount of power that will be returned from the cavity through each of the radiating elements, if the set of operating parameters is applied at a given input power level.

Method 400 may further include a step 404 of choosing among the plurality of sets of operating parameters at least one set based on the estimation made in step 402. For example, if the temperature of one of the dummy loads was measured to be near a safety threshold, the chosen set may be that expected to result in the least heating of that dummy load. In another example, the set or sets of operating parameters that distribute the returned power most equally between the dummy loads may be chosen. Once at least one set of operating parameters is chosen, the system may be controlled to operate at the chosen set or sets of operating parameters (step 450). Operation may be by inputting to the cavity high power, effective for processing the object. High power may be, for example, between 200 W to 2000 W (e.g., in total through all the radiating elements). Operation of the system at the chosen set of operating parameters may be for limited time, after which steps 402 and 404 are repeated before another execution of step 450 for some limited time period. The limited time periods may be predefined (e.g., 1 second, 0.1 seconds, 30 seconds, etc.). In some embodiments, the limited time period may be determined ad hoc, for example, as long as the temperature of any dummy load does not exceed a predetermined threshold.

In some embodiments, method 400 may also include a step 406 of estimating the field distribution that will be excited in the cavity by operating the system at each of the plurality of sets of operating parameters. The field distribution may be estimated, for example, based on simulations done in advance. For example, simulation results, associating each set of operating parameters with a corresponding field distribution may be saved on a memory accessible to a processor (e.g., processor 150), and the estimation is that the saved field distribution will be excited. At times, one set of operating parameters (e.g., at one frequency-phase combination), the field distribution excited in the cavity (or estimated to be excited) may have a maximum at a region where one portion of the object lies, while another set of operating parameters (e.g., the same frequency but in combination with another phase) may produce a field distribution that is a mirror image of the field distribution excited in the cavity by the first set of operating parameters. In such a case, in some embodiments, the choice is made taking into consideration which portion of the cavity is to be heated more at the present stage of processing. If there are several sets that all heat the same region, and this regions is to be heated, one (or more) of the sets may be chosen based on the distribution of returning powers between the dummy loads. In some embodiments, two (or more) sets are chosen, and are applied one after the other, possibly in an iterative manner. For example, if two sets heat the same region and cause different distributions of the returning powers, they may be used repeatedly one after the other, so that the region is heated, while none of the dummy loads is over heated.

In some embodiments, method 400 may also include a step 408 of measuring the temperatures of each of the dummy loads. The measurements may be taken using a temperature sensing arrangement as described herein. In some embodiments, obtaining a value for the measured temperature of each dummy load may allow taking into consideration this value in the process of choosing a set of operating parameters. For example, if a hotter dummy load is expected to receive a first amount of energy from a first set of operating parameters, and a colder dummy load is expected to receive the same amount of energy from a second set of operating parameters, the second set may be chosen, to avoid heating the hotter dummy load even more. In the present example the "hotter dummy load" is hotter than the "colder dummy load". Temperature measurement of the dummy loads may be used for choosing sets of operating parameters, for determining when the estimation and choice of steps 402 and 404 are to be repeated, or for any other purpose. The temperature of the dummy loads may be measured by a temperature sensing arrangement, e.g., as described in FIG. 1.

In some embodiments, system 200 illustrated in FIG. 2, or any other system for processing objects as described herein may include a processor (e.g. processor) 150 configured to carry out method 400.

According to some embodiments, processor 150 and power supply 151 may be operatively coupled with RF feeding modules 190A and 190B that may for example include modulators 152A and 152B and amplifiers 153A and 153B, respectively. The above-mentioned component may be operatively coupled with each other, for example, via signal lines 101. Modulators 152A and 152B may be operative to modulate amplitude (e.g., power) and/or phase and/or frequency of an RF signal (not shown), while amplifiers 153A and 153B may be employed for providing sufficient amplification of the RF signal generated through power supply 151 for feeding the radiation into cavity 210. Modulators 152A and 152B and amplifiers 153A and 153B may be operative to modulate operating parameters, such as, the amplitude difference or ratio and/or phase difference and/or frequency and/or power of the RF signal during both the "default heating mode" and the "overheat protection" heating mode. In the "default heating mode" the operating parameters may be adjusted to heat product 230 according to a heating scheme. The "default heating mode" may be determined based on a feedback measurements received from cavity 210, for example, RF signals reflected back from cavity 210 to radiating elements 220A and 220B and detected by a detector 170. Additionally or alternatively, the feedback may include measurements of the temperature of product 230 and/or of dummy loads 165A and 165B. In the "overheat protection" heating mode, the operating parameters may be adjusted to allow decrease in the temperature of dummy load 165A and/or 165B.

It should be noted that the use of the term "RF feeding module" is for exemplifying purposes only and should be no means to be construed as limiting. For instance, an RF feeding module may, according to some embodiments, be construed to include power supply 151. In some embodiments, each RF feeding module may comprise a respective power supply. Alternatively, the one or more RF feeding modules may share an amplifier and/or modulator.

According to some embodiments, power supply 151 may include any component(s) that may be suitable for generating and supplying electromagnetic energy (e.g., RF energy) like for example, for an RF energy application. For example, the power supply may be configured to generate RF waves that carry electromagnetic energy. For example, the power supply may include a magnetron configured to generate high power microwaves at a predetermined wavelength or frequency. Alternatively or additionally, the power supplier may include a semiconductor oscillator, e.g., a voltage controlled oscillator, configured to generate AC waveforms (e.g., AC voltage or current) with a controllable frequency. The frequency of the AC waveforms may be controllable to be constant or to vary. AC waveforms may include sinusoidal waves, square waves, pulsed waves, triangular waves, or any other types of waveforms with alternating polarities. Alternatively or additionally, power supply may include an electromagnetic field generator, an electromagnetic flux generator, a solid state power amplifier or any mechanism for generating vibrating electrons.

According to some embodiments, operating parameters of heating system 200 may be adjusted if the temperature sensed by temperature sensor 130 exceeds a certain temperature threshold during an entire predetermined time period. In other words, the operating parameters may be adjusted if the temperature sensed by temperature sensor 130 exceeds the certain temperature threshold for a sufficient predetermined amount of time (e.g., 5 seconds) not to be considered as a transient increase in the temperature of the dummy load(s). For example, an operating parameter of heating system 200 may be adjusted if the temperature sensed by temperature sensor 130 exceeds e.g., 150° C., 180° C. or 200° C. during, e.g., at least an entire 1, 2, or 5 seconds. By suitable regulation of a modulator and/or an amplifier (e.g., modulator 152A and/or amplifier 153A), processor 150 may then for example cause RF energy to be provided into cavity 210 intermittently or at a reduced amplitude or power for a predetermined time period to prevent, for example, overheating of product 230 and eventually allow the temperature of product 230 to decrease.

Additionally or alternatively, phase and/or frequency of the RF radiation being fed into cavity 210 via the feeding module(s) may be adjusted based on the measured temperature of product 230 to change an electrical field pattern in cavity 210, for example, to increase absorption of energy by product 230 which, in turn, may cause a reduction in the intensity of RF energy being fed into dummy loads 165A and 165B. As a result, an increase in the temperature of the dummy loads may be avoided or their temperature may decrease.

Once the temperature measured by temperatures sensors 130A and/or 130B is below a predetermined low temperature threshold during a predetermined time period, processor 150 may regulate the application of RF radiation according to the default heating operation mode.

Figure 3:
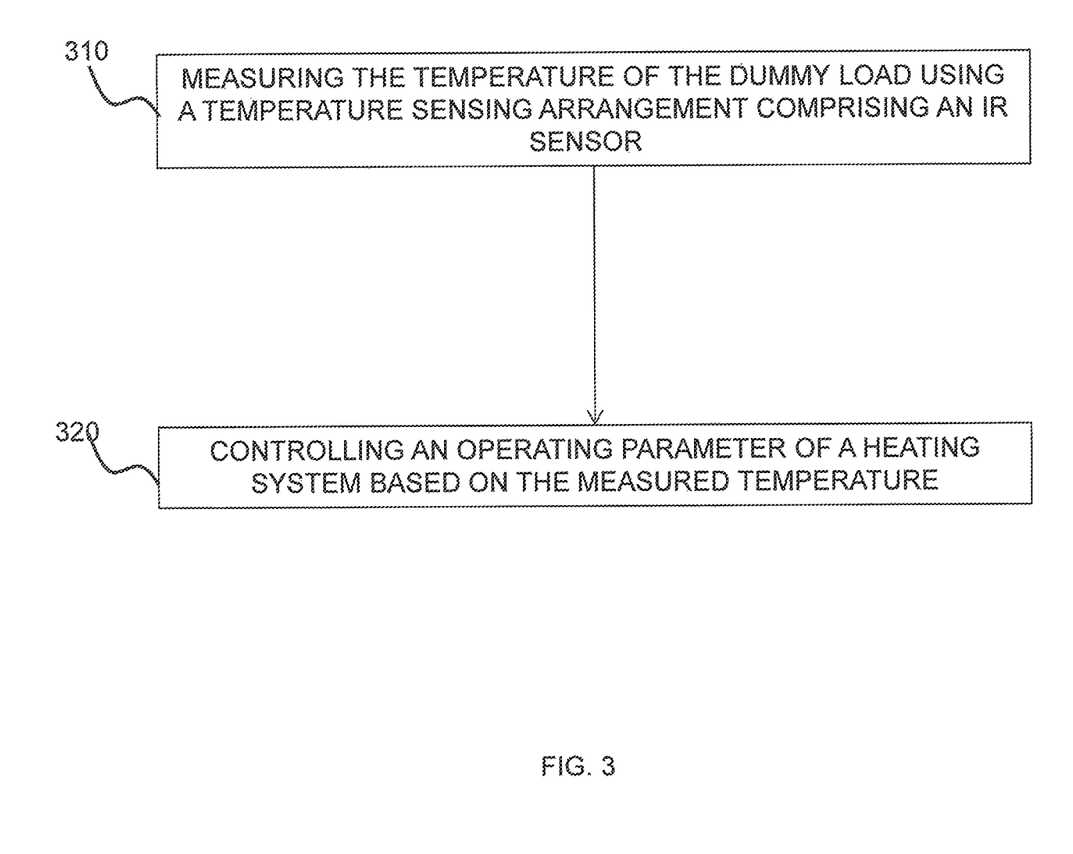
FIG. 3 is a flowchart illustration of a method of controlling an RF feeding module.

Referring now to FIG. 3, a method for controlling an RF feeding module according to embodiments of the invention may for example comprise, as indicated by box 310, measuring the temperature of object 160, which may for example be embodied by one or more dummy loads 165A and 165B or by product 230, using a temperature sensing arrangement 100, e.g., as depicted in FIG. 1.

According to some embodiments, the method may include, as indicated by box 320, controlling an RF feeding module (e.g., RF feeding modules 190A and/or 190B) based on the measured temperature. For instance, operating parameters of heating system 200 may be adjusted if the temperature sensed by temperature sensor 130 exceeds a certain temperature threshold for the entire length of a predetermined time period. The temperature sensed may exceed a certain temperature threshold for a sufficient period of time, as not to be considered as a transient increase in the temperature of the dummy load(s). For example, operating parameter of heating system 200 may be adjusted if the temperature sensed by temperature sensor 130 exceeds e.g., 150° C., 180° C. or 200° C. for at least 1 second, for example. In some embodiments, by suitable regulation of a modulator and/or an amplifier (e.g., modulator 152A and/or amplifier 153A) of a feeding module, processor 150 may for example cause RF energy to be provided into cavity 210 intermittently or at a reduced amplitude or power for a predetermined time period to prevent, for example, overheating of product 230 (and/or dummy load 165A and/or 165B) and eventually allow the temperature of product 230 (and/or dummy load 165A) to decrease. Additionally or alternatively, phase and/or frequency of the RF radiation being fed into cavity 210 via the feeding module(s) may be adjusted based on the measured temperature of product 230 (and/or dummy load 165A and/or 165B) to change an electrical field pattern in cavity 210, for example, to increase absorption of energy by product 230 which, in turn, may cause a reduction in the intensity of RF energy being fed into the dummy loads. As a result, an increase in the temperature of the dummy loads may be avoided or their temperature may decrease. Once the temperature measured by temperature sensor 130 (e.g., temperatures sensors 130A and/or 130B) is below a predetermined low temperature threshold for an entire predetermined time period (e.g., 1 second), processor 150 may regulate the application of RF radiation according to the default heating operation mode.

According to some embodiments, the method may include controlling an RF feeding module 190 and/or a power supply (e.g., power supply 151) according to an EM feedback received from cavity 210. For example, processor 150 may set or determine a phase difference between electromagnetic radiation to be emitted by radiating elements 220A and 220B and/or a frequency of the electromagnetic radiation to be emitted by to be emitted by radiating elements 220A and 220B, based on the EM feedback received from cavity 210.

The EM feedback may include one or more detectable parameters relating to RF emission or RF radiation such as, for example, power, frequency, energy, current, voltage, phase differences, etc. In some embodiments, heating system 200 may comprise a detector 170 that may be operatively coupled with at least one of the radiating elements located in cavity 210 for detecting feedback from cavity 210. Detector 170 may for example be operatively associated with radiating elements 220A and 220B and processor 150.

Detector 170, which may include a directional coupler (not shown), may be configured to pick up electromagnetic radiation coupled to radiating element 220A and 220B, based on which processor 150 may operate heating system 200. According to some embodiments, detector 170 may for example be configured to measure and/or detect one or more parameters associated with radiating element 220A and/or radiating element 220B. For example, detector 170 may be configured to measure and/or detect the energy emitted from one radiating element, e.g., radiating element 220A ("emitted energy") and the energy reflected back to the same radiating element ("reflected energy"). Additionally or alternatively, detector 170 may be configured to measure and/or detect energy coupled to other radiating element(s) (e.g., to radiating element 220B as a result of RF energy emission from another radiating element (e.g., radiating element 220A). Such energy (i.e., emitted by one radiating element and received by another) may be referred to herein as "coupled energy".

In some embodiments, the processor may control the EM energy (e.g., RF energy) application. In some embodiment, the processor may control the EM energy based on an EM feedback detected from the cavity. For example, the processor may control (e.g., select) the frequency radiated from each of the radiating elements located in the cavity. In some embodiments, the processor may control a single radiating element to radiate EM waves at a single frequency. In some embodiments, the processor may control a plurality of radiating elements to radiate EM waves at the same frequency or at different frequencies. For example, at least two of the plurality of radiating elements may be controlled to radiate EM waves at different frequencies. Additionally or alternatively, the processor may control one radiating element to radiate EM waves at multiple frequencies, e.g., seriatim, or simultaneously by a signal composed of multiple frequency components. In some embodiments, the processor may control a power supply to sweep through a plurality of frequencies, with each frequency supplied to at least one of the radiating elements. The sweeping operation may be conducted in a synchronized manner (e.g., at least two radiating elements receive and/or radiate EM waves with the same sweeping frequency simultaneously) or in an unsynchronized manner. In some embodiments, the processor may determine (e.g., select) one or more frequencies to be radiated to the cavity based on one or more EM feedbacks.

In some embodiments, a phase difference between signals emitted by two radiating elements may be determined (e.g., selected) based on an EM feedback received from the cavity. In some embodiments, the EM feedback may be obtained by applying a plurality of RF waves to the cavity at a plurality of phase differences.

In the discussion unless otherwise stated, adjectives such as "substantially" and "about" modifying a condition or relationship characteristic of a feature or features of an embodiment, are understood to mean that the condition or characteristic is defined to within tolerances that are acceptable for operation of the embodiment for an application for which it is intended.

As used herein, if a machine (e.g., a processor) is described as "configured to" perform a task (e.g., configured to cause application of a predetermined field pattern), then, at least in some embodiments, the machine may include components, parts, or aspects (e.g., software) that enable the machine to perform a particular task. In some embodiments, the machine may perform this task during operation. Similarly, when a task is described as being done "in order to" establish a target result (e.g., in order to apply a plurality of electromagnetic field patterns to the object), then, at least in some embodiments, carrying out the task may accomplish the target result.

As used herein, the term predetermined means only that the associated quantity or value is calculated or otherwise determined before processing is completed. The predetermination may occur at any time before the processing is completed, for example, before the processing of the product starts (e.g., saved in a memory associated with the processor or received from a user via a user interface, prior to the beginning of the processing), during the processing of product and/or at various stages in the processing (e.g., when the energy application is paused for measuring). The predetermination may be done automatically, using a code included in the processor, may be received from a user via a user interface and/or may be stored in a memory (e.g., a database) associated with the processor. Predetermined values may include values stored in memory; values calculated, observed, measured, read into, received, etc. before commencement of electromagnetic energy processing; or any values calculated, observed, measured, read into, received, etc. during such processing.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed is:

1. A system for processing objects by radio frequency (RF) energy in a cavity, the system comprising:
    a cavity;
    an RF feeding module that comprises: a plurality of radiating elements configured to feed RF radiation into the cavity to process the objects in the cavity, and a plurality of dummy loads outside of the cavity for receiving RF energy coupled from the cavity into the radiating elements; and
    a processor configured to:
        estimate an effect that operating the system at each of a plurality of sets of operating parameters will have on the temperature of each of the dummy loads;
        choosing among the plurality of sets of operating parameters, at least one set based on the estimate; and
        controlling the system to operate at the chosen at least one set of operating parameters,
    wherein the choosing maintains the temperature of the dummy loads within a safe temperature range.

2. A system according to claim 1, wherein the processor is configured to estimate the effect by estimating amounts of power, each of which will be returned from the cavity through one of the radiating elements.

3. A system according to claim 1, wherein the processor is configured to estimate field distributions, each of which will be excited in the cavity by operating the system at a corresponding one of the plurality of sets of operating parameters, and choose the at least one set based on the estimation of the field distribution associated with the at least one set and the estimate of the effect of the at least one set on the temperature of each dummy load.

4. A system for precession objects by radio frequency (RF) energy in a cavity, the system comprising:
    a cavity;
    an RF feeding module that comprises: a plurality of radiating elements configured to feed RD radiation into the cavity to process the objects in the cavity, and a plurality of dummy loads outside of the cavity for receiving RF energy coupled from the cavity into the radiating elements; and
    a processor configured to:
        estimate an effect that operating the system at each of a plurality of sets of operating parameters will have on the temperature of each of the dummy loads;
        choosing among the plurality of sets of operating parameters, at least one set based on the estimate; and
        controlling the system to operate at the chosen at least one set of operating parameters; and
    further comprising at least one temperature sensing arrangement configured to measure temperatures of each of the dummy loads.

5. A system according to claim 4, wherein the processor is configured to choose the at least one set of operating parameters based on a measured temperature of each dummy load.

6. A system according to claim 5, wherein the at least one temperature sensing arrangement measures the temperature of an object positioned in an electromagnetically noisy space with respect to radiofrequency (RF) frequencies, the arrangement comprising:
    an RF filter, wherein the RF filter is configured to allow propagation of infrared (IR) radiation through the RF filter and configured so that propagation of RF frequencies through the RF filter is unsupported; and
    a temperature sensor operative to measure the temperature of an object based on an amount of the IR radiation that propagates through the RF filter and arranged with respect to the RF filter such to be unaffected by the RF frequencies;
    wherein the RF filter comprises electrically conductive walls defining an electrically non-conductive core, and
    wherein dimensions of the non-conductive core are such that propagation of frequencies of electromagnetic noise through the core is not supported while the propagation of IR radiation through the core is allowed.

7. A system according to claim 4, wherein the at least one temperature sensing arrangement measures a temperature of an object positioned in an electromagnetically noisy space with respect to radiofrequency (RF) frequencies, the arrangement comprising:
    an RF filter, wherein the RF filter is configured to allow propagation of infrared (IR) radiation through the RF filter and configured so that propagation of RF frequencies through the RF filter is unsupported; and
    a temperature sensor operative to measure the temperature of an object based on an amount of the IR radiation that propagates through the RF filter and arranged with respect to the RF filter such to be unaffected by the RF frequencies;

wherein the RF filter comprises electrically conductive walls defining an electrically non-conductive core, and wherein dimensions of the non-conductive core are such that propagation of frequencies of electromagnetic noise through the core is not supported while the propagation of IR radiation through the core is allowed.

8. A system for dielectrically processing a product in a radio frequency (RF) cavity, the system comprising:
an RF feeding module that is operative to feed RF energy into the cavity at various frequencies for processing the product;
a dummy load, in an electromagnetically noisy space outside of the cavity, configured to receive RF energy returning from the cavity; and
a temperature sensing arrangement configured to measure a temperature of the dummy load, wherein the temperature sensing arrangement comprises:
an RF filter configured to allow propagation of infrared (IR) radiation through the RF filter and configured so that propagation of various frequencies through the RF filter is decreased by at least 10 dB; and
a temperature sensor operative to measure a temperature of an object based on the amount of JR radiation that propagates through the RF filter and arranged with respect to the RF filter to be unaffected by the electromagnetic noise in the electromagnetically noisy space.

9. A system according to claim 8, comprising:
a processor that is operatively coupled with the RF feeding module and the temperature sensing arrangement to enable operating the RF feeding module based on a measured temperature of the dummy load.

10. A system according to claim 9, wherein the processor is programmed to operate the RF feeding module based on the temperature of the dummy load as measured by the temperature sensing arrangement.

11. A system according to claim 8, wherein the RF filter comprises electrically conductive walls defining an electrically non-conductive core,
wherein the dimensions of the non-conductive core are such that propagation of frequencies of electromagnetic noise through the core is not supported while the propagation of IR radiation through the core is allowed.

12. A system according to claim 8, wherein the temperature sensor is arranged in an EMI-free space that is created by an electromagnetic shielding; and
wherein the EMI-free space and the electromagnetically noisy space are in IR radiation communication with each other via the RF filter.

13. A system according to claim 12, wherein the electromagnetic shielding is configured for creating the EMI-free space.

14. A system according to claim 12, wherein the RF filter is in communication with the electromagnetically noisy space via an opening in the electromagnetic shielding.

15. A system according to claim 14, wherein the RF filter and the electromagnetic shielding are integrally formed.

16. A system according to claim 8, wherein the RF filter comprises an RF waveguide having a cutoff frequency above any one of the various frequencies, and a length sufficient to attenuate any one of the various frequencies by at least 10 dB.

* * * * *

UNITED STATES PATENT AND TRADEMARK OFFICE
CERTIFICATE OF CORRECTION

PATENT NO. : 9,989,417 B2
APPLICATION NO. : 15/021454
DATED : June 5, 2018
INVENTOR(S) : A. Libman et al.

Page 1 of 1

It is certified that error appears in the above-identified patent and that said Letters Patent is hereby corrected as shown below:

In the Claims

Column 19, Line 23 (Claim 8, Line 17) please change "of JR" to -- of IR --

Signed and Sealed this
Eighth Day of January, 2019

Andrei Iancu
*Director of the United States Patent and Trademark Office*